US009619439B1

(12) United States Patent
Stell et al.

(10) Patent No.: US 9,619,439 B1
(45) Date of Patent: Apr. 11, 2017

(54) INCREMENTAL WEB FONT LOADING

(71) Applicant: Google Inc., Mountain View, CA (US)

(72) Inventors: Brian Stell, Palo Alto, CA (US); Han-Wen Yeh, Bellevue, WA (US)

(73) Assignee: Google Inc., Mountain View, CA (US)

( * ) Notice: Subject to any disclaimer, the term of this patent is extended or adjusted under 35 U.S.C. 154(b) by 379 days.

(21) Appl. No.: 14/191,360

(22) Filed: Feb. 26, 2014

Related U.S. Application Data

(60) Provisional application No. 61/769,695, filed on Feb. 26, 2013.

(51) Int. Cl.
*G06F 17/00* (2006.01)
*G06F 17/21* (2006.01)
(52) U.S. Cl.
CPC .................................. *G06F 17/214* (2013.01)
(58) Field of Classification Search
CPC ..................................................... G06F 17/214
USPC ................................................. 715/269, 256
See application file for complete search history.

(56) References Cited

U.S. PATENT DOCUMENTS

| | | | |
|---|---|---|---|
| 7,064,757 B1 * | 6/2006 | Opstad ................. | G06F 17/214 345/467 |
| 9,081,529 B1 * | 7/2015 | Joshi .................... | G06F 17/214 |
| 9,164,968 B2 * | 10/2015 | Stell ..................... | G06F 17/214 |
| 2005/0193336 A1 * | 9/2005 | Fux ...................... | G06F 17/214 715/269 |
| 2010/0218086 A1 * | 8/2010 | Howell ................. | G06F 17/214 715/236 |
| 2011/0271180 A1 * | 11/2011 | Lee ...................... | G06F 17/214 715/269 |
| 2014/0240731 A1 * | 8/2014 | Cogan .................. | G06K 15/1802 358/1.9 |

\* cited by examiner

*Primary Examiner* — Stephen Hong
*Assistant Examiner* — Matthew Ludwig
(74) *Attorney, Agent, or Firm* — McDermott Will & Emery LLP

(57) ABSTRACT

A system and machine-implemented method for providing a font is provided. A request is received from a client device to download a font. The requested font is accessed, where the accessed font includes a corresponding character map and a corresponding glyph table. A supported character list and a modified font based on the corresponding character map, the modified font is compressed, and the supported character list and the compressed modified font are sent to the client device. Character data is also sent to the client device, wherein the character data is for merging the at least one character into the modified font based on information in the character data.

20 Claims, 7 Drawing Sheets

INCREMENTAL WEB FONT LOADING

RELATED APPLICATION

This application claims priority to U.S. provisional patent application 61/769,695, filed on Feb. 26, 2013, entitled "INCREMENTAL WEB FONT LOADING," the contents of which are herein incorporated by reference in its entirety.

BACKGROUND

The present disclosure generally relates to providing data to a system over a network, and, in particular, to incrementally providing font files to a system for loading.

Web fonts are often utilized by web developers as a tool to stylize text or symbols that appear in webpages. For example, a web developer may want to use a unique font that is not available on a particular user's system. Such use requires the download of web font files to properly display certain webpages. However, downloading web font files may take a long time, particularly if the font file is large. Delays in rendering a webpage as a result of the downloading diminish the user experience and thus hinder the wide scale adoption of web fonts. Thus, it may be desirable to implement a system for efficiently providing web font files to a user's system.

SUMMARY

The disclosed subject matter relates to a computer-implemented method for providing a font. The method includes receiving a request from a client device to download a font, accessing the requested font, wherein the accessed font comprises a corresponding character map and a corresponding glyph table, and creating a supported character list and a modified font based on the corresponding character map. The method further includes compressing the modified font, sending the supported character list and the compressed modified font to the client device, and sending, to the client device, character data comprising glyph data for at least one character in the font from the glyph table and location data for the glyph data, wherein the glyph data is for merging the at least one character into the modified font based on the location data.

The disclosed subject matter also relates to a non-transitory machine-readable medium comprising instructions stored therein, which when executed by a system, cause the system to perform operations including receiving a request from a client device to download a font. The operations include receiving a request from a client device to download a font, accessing the requested font, wherein the accessed font comprises a corresponding character map and a corresponding glyph table, creating a supported character list and a modified font based on the corresponding character map, and compressing the modified font. The operations further include sending the supported character list and the compressed modified font to the client device and sending, to the client device, character data comprising at least one character and location data for the at least one character, wherein the character data is for merging the at least one character into the modified font based on the location data.

According to various aspects of the subject technology, a system for providing a font is provided. The system includes one or more processors and a machine-readable medium comprising instructions stored therein, which when executed by the processors, cause the processors to perform operations. The operations receiving a request from a client device to download a font, accessing the requested font, wherein the accessed font comprises a corresponding character map and a corresponding glyph table, creating a supported character list and a modified font based on the corresponding character map, and compressing the modified font. The operations further include sending the supported character list and the compressed modified font to the client device, sending first character data for characters in the modified font to the client device, wherein the first character data is for merging into the modified font, and sending a second character data for characters in the modified font to the client device, wherein the second character data is for merging into the modified font, and wherein each character in the second character data is different from characters in the first character data.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology. Additionally, while portions of the detailed description below describe the subject technology as it relates to rendering webpages, the subject technology may be applied to a variety of additional web-based applications that utilizes font files.

The disclosed subject matter provides for incremental web font loading. More particularly, when a web font is requested by a client device, a server accesses the requested font and creates a supported character list and a specially modified font based on a character map corresponding to the requested font. The supported character list and the specially modified font are then sent to the client device. The specially modified font is subsequently filled out at the client device based on the supported character list and character data that is sent from the server to the client device. The character data may include data needed to render characters. For example, the character data for one character in the font may include a glyph of that character and additional information associated with the character (e.g., location data indicating where the glyph of that character should be stored in the modified font).

In some cases, the character data is sent in one or more separate transmissions. By sending the character data in one or more separate transmissions, applications are provided more immediate access to parts of the font file, as compared to having to download the entire font file at the time the web font is requested. For example, the client device may begin using the received character data while character data for the rest of the font file is being requested and/or transmitted.

Figure 1:
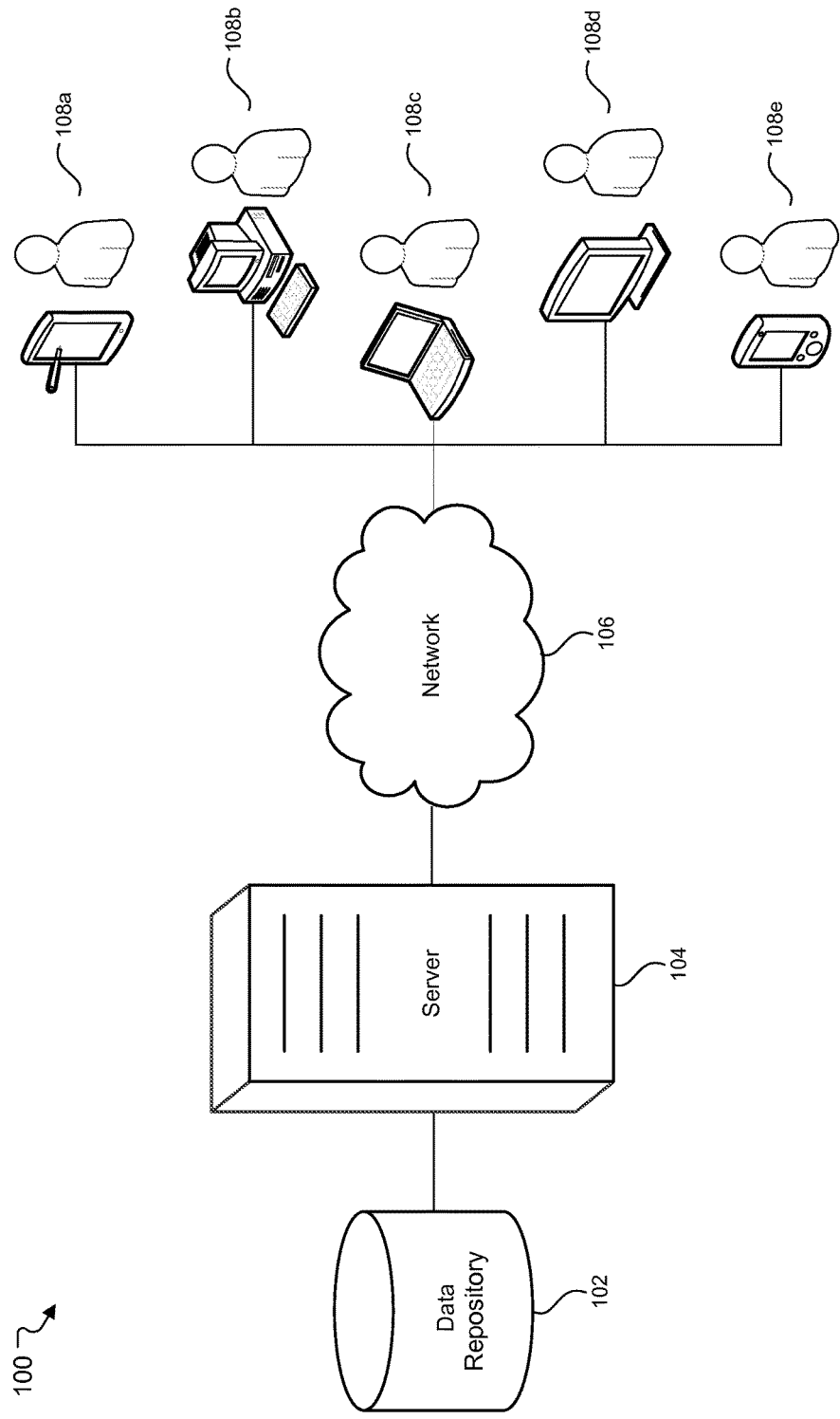
FIG. 1 illustrates an example network environment which provides for incremental web font loading.

FIG. 1 illustrates an example network environment which provides for incremental web font loading. Network environment 100 includes a data repository 102 (e.g., computer-readable storage media) for storing a variety of data accessed by web-based applications. While the network environment 100 includes a single data repository 102 in FIG. 1, the network environment may include additional data repositories in some implementations. Data repository 102 may store data utilized to render webpages, for example the content of webpages including font files of related web fonts.

The network environment 100 further includes server 104. While the network environment 100 includes a single server in FIG. 1, the network environment may include several interconnected servers in some implementations. Server 104 may receive requests from user-operated client devices 108a-108e. Server 104 and client devices 108a-108e may be communicatively coupled through a network 106. In some implementations, client devices 108a-108e may request data from server 104. Upon a user navigating to a particular webpage, server 104 may receive a request for downloading a font file corresponding to a web font from data repository 102. Server 104 may serve the font file to client devices 108a-108e in response to the request.

Each of client devices 108a-108e represents various forms of processing devices. Examples of a processing device include a desktop computer, a laptop computer, a handheld computer, a television coupled to a processor or having a processor embedded therein, a personal digital assistant (PDA), a network appliance, a camera, a smart phone, a media player, a navigation device, an email device, a game console, or a combination of any of these data processing devices or other data processing devices.

Each of client devices 108a-108e may be any system or device having a processor, a memory, and communications capability for providing content to the electronic devices. In some example aspects, server 104 can be a single computing device, for example, a computer server. In other embodiments, server 104 can represent more than one computing device working together to perform the actions of a server computer (e.g., cloud computing). Further, each of client devices 108a-108e can represent various forms of servers including, but not limited to a web server, an application server, a proxy server, a network server, or a server farm.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, including a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

In example aspects, an application running on one of client devices 108a-108e may require a font that is not available on the particular client device. Accordingly, the client device may submit a request to server 104 to download a font file corresponding to the required font. Upon receipt of this request, server 104 may retrieve the font file from data repository 102 and serve the font file to be stored on a local memory of the requesting client device. The font file may be served as several components to the client device. For example, a supported character list and a modified font based may be sent to the client device. The modified font may be subsequently populated as character data is sent from the server to the client device in a number of separate communications. By sending the character data in a number of separate communications, applications may be provided access to parts of the font file to be used immediately while communications that include additional character data continues to be served or is served at a later time.

Figure 2:
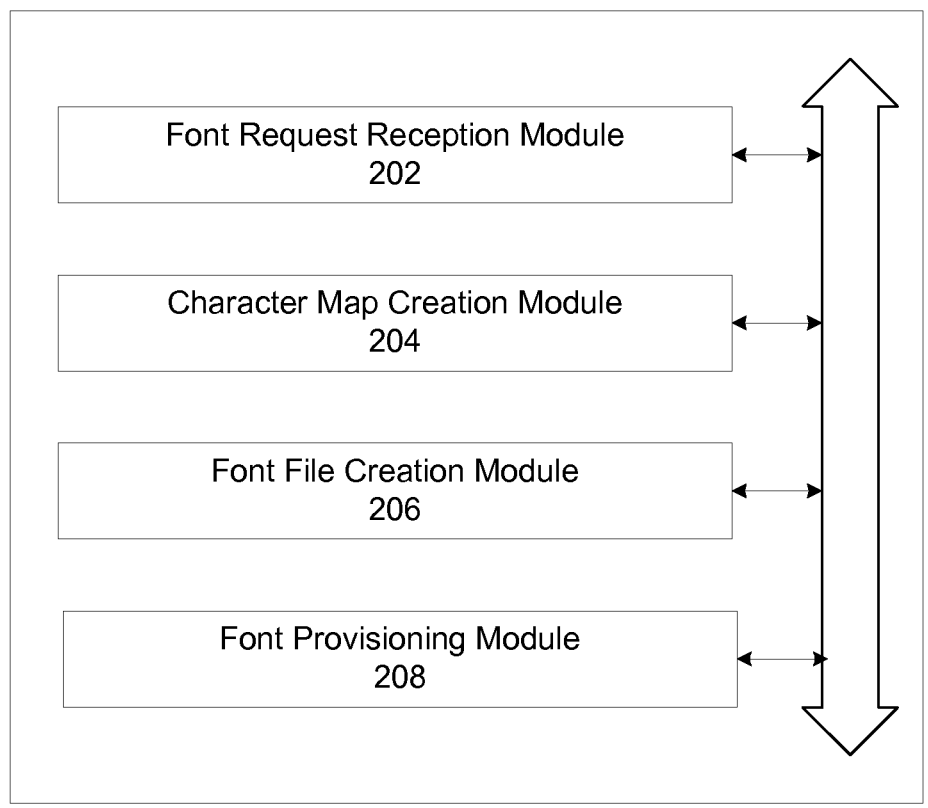
FIG. 2 illustrates an example of a server system for incremental web font loading.

FIG. 2 illustrates an example of a server system for incremental web font loading. System 200 includes font request reception module 202, character map creation module 204, font file creation module 206, and font provisioning module 208. These modules, which are in communication with one another, receive requests for font files corresponding to web fonts and serve font files associated with the web fonts to client devices 108a-108e. When a request for a web font is received by font request reception module 202, the requested font is accessed from data repository 102. The accessed font may include a corresponding character map that includes mappings from character encodings to glyph data in a glyph table for the characters. Character map creation module 204 then creates a supported character list for the requested font based on a character map corresponding to the accessed font. Additionally, font file creation module 206 creates a modified font corresponding to the accessed font. The modified font may include, for example, a character map, a glyph table, and other information needed to implement the font (e.g., additional tables).

In some implementations, the modified font the character map in the modified font may include the character map data (e.g., mapping data that maps character encodings to glyph data) that is replaced with a particular value (e.g., the character encodings may be set to all zeroes or another constant value). The character map data in the modified font is set to the particular value to act as a place holder so that the character map may be compressed more efficiently. The modified font may subsequently be compressed, which may reduce the size of the modified font. Once the supported character list and modified font have been created, and the modified font has been compressed, font provisioning module 208 sends the supported character list and compressed modified font to the requesting client device.

When the character map arrives at the client device, it may be decompressed. When the character map is initially received, as described above, the character map data in the character map may be set to a particular value. Having the character map data set to the particular value may indicate to the client device that particular characters are supported by the font, but character data for those characters have not yet been received from the server. The client device may be configured to receive character data for the modified font and replace the character map data in the character map with actual character data from the requested font as it is received from the font provisioning module 208. More specifically, the font provisioning module 208 sends character data for the modified font to the client web browser in one or more separate communications. The character data can then be merged into the modified font. For example, the character data received corresponding to the character map data may overwrite the placeholder data in the character map previously set by the font file creation module 206. According to another aspect, the character data received corresponding to the glyph data in a glyph table may also overwrite placeholder data in the glyph table if the glyph table was previously altered by the font file creation module 206.

By sending the supported character list and modified font first and subsequently sending character data, the requested font becomes usable to the client device in a shorter amount of time than sending the entire font at the same time. For example, in order for the client device to render a webpage, only a subset of the characters of the font may be required. Thus, by sending the character data for those characters necessary for rendering the webpage to the client device first, and subsequently populating the remainder of the font by sending additional character data in further communications, the client device is able to render the webpage with less delay.

According to some aspects, all of the character data received by the client device may be saved locally on the client device for future use. For example, a first webpage may require a certain subset of characters of a particular font to render properly, once the web browser on the client device receives character data for that subset of characters, the character data may be stored locally on a persistent memory for later use and render the webpage. A second webpage may require some of the same characters as the first web page as well as different characters of the font. If the web browser on the client device is instructed to load the second webpage, there is no need to request character data that was previously received in connection with loading the first webpage. Instead, only character data for the characters in the font that were not previously received, thereby reducing the amount of data needed to be transmitted and the amount of time needed to load the second webpage.

In some aspects, the modules may be implemented in software (e.g., subroutines and code). The software implementation of the modules may operate on server 104. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3A:
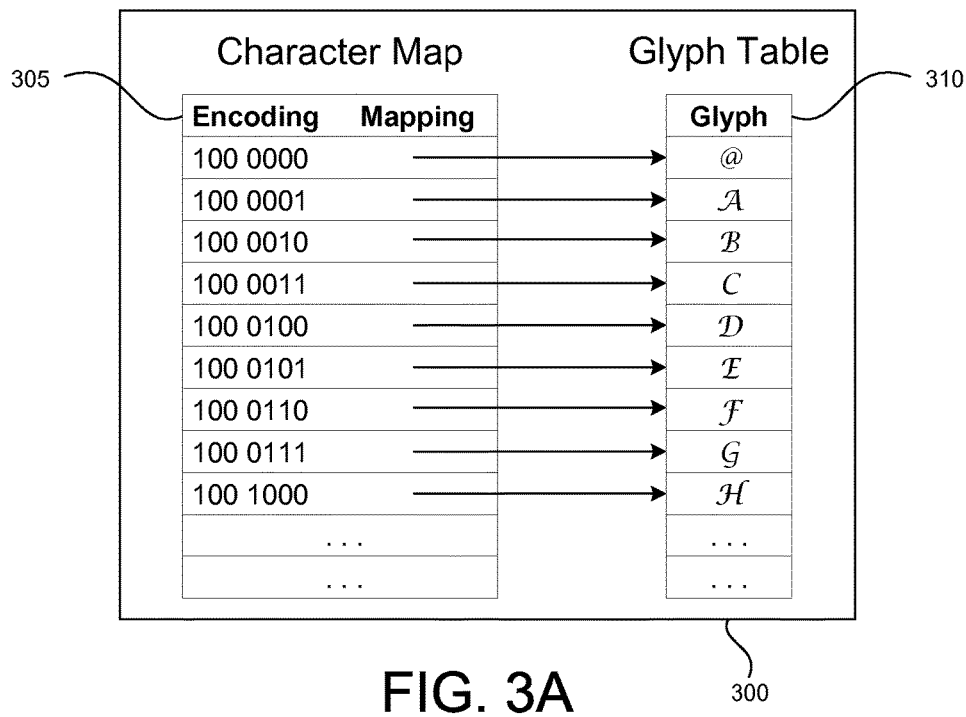
FIG. 3A illustrates an example web font.

FIG. 3A illustrates an example web font 300, in accordance with various aspects of the subject technology. The web font 300 shown in FIG. 3A is simplified for illustrative purposes and may include additional information associated with the font or other information associated with the font. When a server system receives a request for a web font from a client device, the server system may identify the web font 300 requested and retrieve the requested web font 300 from a data repository (e.g., a database, a hard drive, or other memory device). The web font 300 retrieved from the data repository may include a character map 305 and a glyph table 310.

The character map 305 includes character encodings for each character in the web font while the glyph table 310 stores glyph data for each of the characters in the web font. For example, the character map 305 stores, for each character in the web font, a mapping from the character's character encoding to glyph data for that character stored in the glyph table 310. In FIG. 3A, the character encoding are shown in a binary code although other encodings and/or number systems (e.g., octal, hexadecimal, decimal, etc.) may also be used. The character map 305 and glyph table 310 for the web font 300 accessed by the server system may store information for every character in the web font. Based on the retrieved web font 300, the system server may create a supported character list and a modified font for the retrieved web font 300.

Figure 3B:
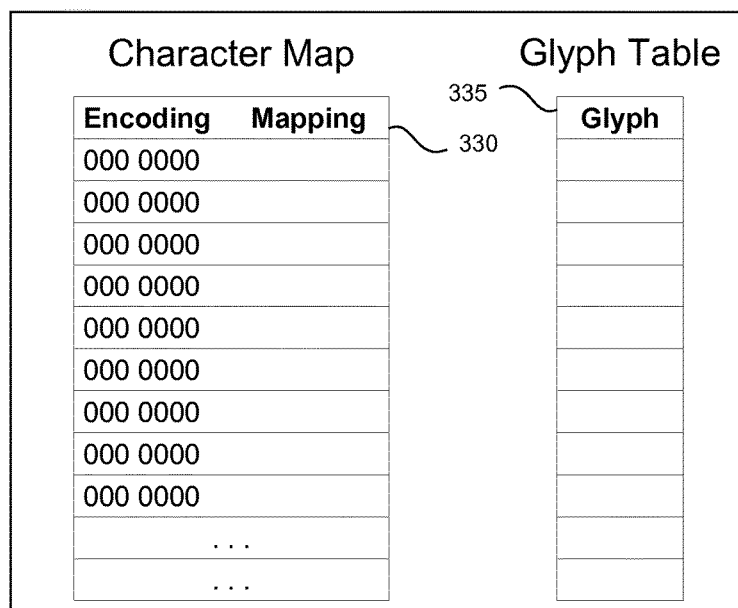
FIG. 3B illustrates an example supported character list and an example modified font.

FIG. 3B illustrates an example supported character list 320 and an example modified font 325, in accordance with various aspects of the subject technology. The modified font 325 may include a character map 330 and a glyph table 335. The character map 330 in the modified font 325 may be an empty character map. For example, the character data (e.g., the mappings) typically stored in a character map, such as character map 305 in FIG. 3A, may be deleted or replaced with a particular value such as zeroes or another constant placeholder value. This enables the modified font to be compressed to a smaller size than if the modified font had a complete character map. According to some aspects of the subject technology, the glyph table 335 in the modified font 325 may also be empty.

The modified font 325 may be compressed and transmitted to the client device where it may be decompressed and filled in with character data sent in subsequent data transmissions. According to some aspects of the subject technology, the client device may request character data for characters or a set of characters that are needed or may be needed. However, not all web fonts include the same characters. To help the client device know which characters are available to be requested, the server system may also create a supported character list 320 based on the web font 300 retrieved from the data repository. The supported character list 320 may include a listing of all characters in the web font and may be configured to be used by a client device to determine which characters character data may be requested.

Figure 3C:
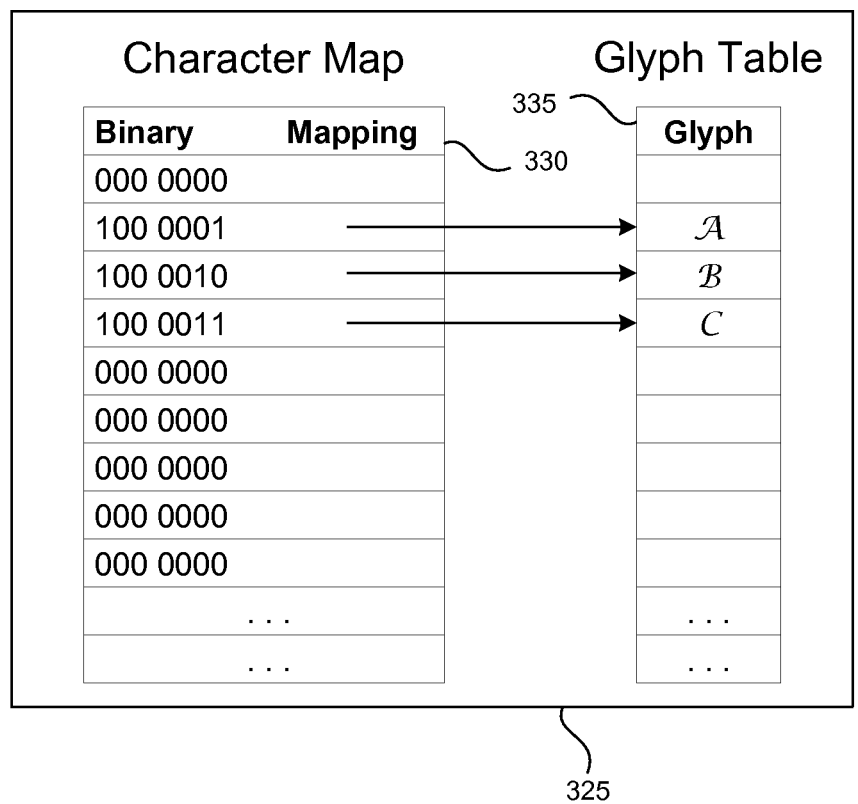
FIG. 3C illustrates an example scenario in which a modified font is filled in with character data.

FIG. 3C illustrates an example scenario in which the modified font 325 is filled in with character data, in accordance with various aspects of the subject technology. Using the supported character list 320 shown in FIG. 3B, a client device may request character data (e.g., character map data and glyph data) for a set of one or more characters in the web font. For example, the client device may request character data for the characters "A," "B," and "C." The server system may receive the request and transmit the requested character data to the client device. The client device may then fill in or replace the placeholder data in the character map 330 of the modified font 325 at the client device with the character map data received from the server system. Similarly, the client device may then fill in or replace the placeholder data in the glyph table 335 of the modified font 325 with the glyph data received from the server system. The example scenario illustrated in FIG. 3C shows the modified font 325 after the client device has filled in the character data for characters "A," "B," and "C" in the character map 330 and the glyph table 335.

According to some aspects of the subject technology, the character data for the characters used by the client device may be requested first while character data for other characters not used by the client device may be requested at a later time. In other implementations, character data for characters not used by the client device may be transmitted by the server system when no further requests are received from the client device.

Figure 4:
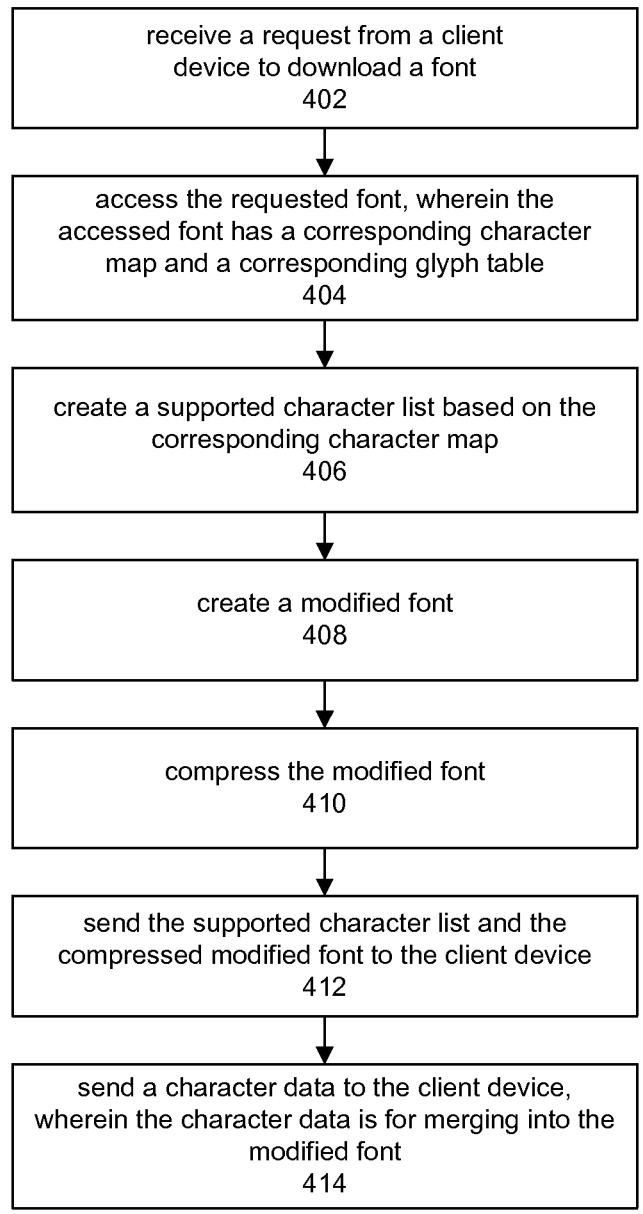
FIG. 4 illustrates an example process for incremental web font loading.

FIG. 4 illustrates an example process for incremental web font loading. A request to download a font is received from a client device in block 402. The request may be received from the client device in response to a navigation of a web browser to a webpage that requires a particular font. In block 404, the requested font is accessed, where the requested font has a corresponding character map and a corresponding glyph table. In some aspects, the requested font is stored on a data repository. Once the font file corresponding to the requested font is accessed, a supported character list is created for the requested font based on the corresponding character map in block 406.

In block 408, a modified font is created based on the requested font accessed at block 404. In some aspects, creating the modified font may involve unfolding the character map corresponding to the requested font and including the unfolded character map in the modified font. For example, the character map corresponding to the requested font may be stored in a "folded" form. In other words, the folded character map may include pointers or other references to character data for a subset of characters in the requested font. In some cases the subset of characters may be a range or characters (e.g., numeral 0-9, lower case letters a-z, upper case letters A-Z, symbols, punctuations, other characters, etc.). In order to access character data for a particular character in the folded character map, the pointer to the subset of characters that the particular character as well as an offset from the pointer that indicates the location of the character data for the particular character is needed.

The folded character map may be unfolded by converting the pointers for subsets of characters and offsets needed to access character data for particular characters to pointers to character data for every character in the font. Accordingly, character data for each character in the unfolded character map has a corresponding pointer so that the character data can be accessed without the need for an offset. In some cases, this allows character data for a particular character to be transmitted to the client device without having to transmit character data for all characters in the set that the particular character belongs to.

In some aspects, creating the modified font may also include filling parts of the modified font with a replacement data (e.g., filling character data in the glyph table entries or other character map data with zeros or other placeholder data). The modified font may be compressed into a smaller size in block 410. Filling the font with constant values (e.g., repeated values) allows the modified font to be compressed, using various compression techniques, to a smaller size which can be downloaded more quickly. Once the supported character list and modified font have been created, and the modified font has been compressed, the supported character list and the compressed modified font are sent to the client device in block 412. The supported character list sent to the client device serves as a guide to the client device for determining what character data for which characters may be requested.

In block 414, character data is sent to the client device. The character data is subsequently merged into the modified font. In some implementations the character data is merged into the modified font based on location information in the character data that indicates where in the modified font the glyph of the character or the other information in the character data should be placed. For example, the constant value data in the glyph table may be replaced by the character data downloaded to the client device based on the location data in the character data. In some aspects, additional sets of characters may be sent to the client device as necessary. By sending the supported character list and modified font first and subsequently sending character data in a number of transmissions, the client device may be able to retrieve character data for characters that are used to render the webpage and render the webpage without having to wait for the entire font to be downloaded. Accordingly, the webpage may be rendered earlier. The remainder of character data for the font (e.g., the glyph table) may be populated by the character data in transmissions sent to the client device at a later time. The character data in each of the transmissions may be saved on the client device until all of the character data for the font have been received.

In some implementations, a request for a particular set of character data may be received from the client device, and the requested character data is served to the client device based on the request. The client device may check if any of the requested character data have already been received, and request only those that are additionally needed by the client web browser (as the web browser is navigated from one web page to a next web page). By compartmentalizing the download of font on an as needed basis, the system may avoid delays that may be caused by attempting to download the complete font from the onset.

Figure 5:
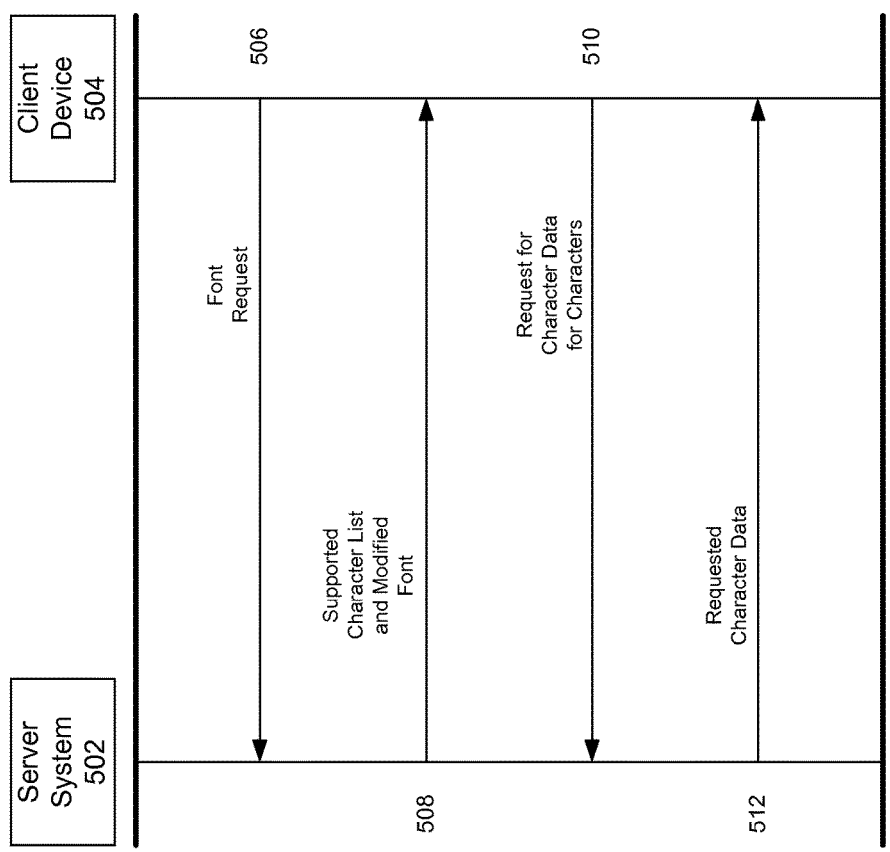
FIG. 5 is a block diagram illustrating example exchanges for incremental web font loading.

FIG. 5 is a block diagram illustrating example exchanges for incremental web font loading. The graphical representation in FIG. 5 shows a server system 502 that serves a font to client device 504 based on a request by the client device 504. Server system 502 is communicatively connected to client device 504. In step 506, a font request is sent from client device 504 to server system 502. In this example, the requested font is a font that is not available on client device 504. In response to the request, server system 502 accesses a font file. From the accessed font file, server system 502 creates a supported character list based on a character map corresponding to the accessed font, and creates a modified font corresponding to the accessed font.

Server system 502 then serves the supported character list and the modified font to client device 504 in step 508. In some aspects, the modified font includes an unfolded character map and a glyph table that has been set to a constant value. The modified font may also be compressed before being sent to client device 504. The supported character list sent to client device provides a roadmap for determining what character data may be requested from the server system 502. After the supported character list and the modified font have been sent, client device 504 may request character data for certain characters from server system 502. The requested character data may correspond to characters necessary to render a particular web page.

Once the request has been received, server system 502 returns the requested character data to client device 504. According to some implementations, the server system 502 may also include additional character data for characters related to the requested characters, even if those characters were not explicitly requested by the client device 504. For example, in one scenario, a client device 504 may request character data for an "e" character. In response to receiving the request for character data for the "e" character, the server may transmit character data for "é" which includes character data for the "e" character as well as character data for the " ́ " accent character. In this way, the server system 502 may be able to transmit character data for two or more related characters. As a result, the client device 504 may receive character data for a character not requested and if, in the future, the client device 504 has use for the additional character, the client device 504 will not need to request additional character data because the client device 504 has already received the character data in response to a request for related character data.

When the requested character data is received at the client device 504, the data in the glyph table of the modified font is replaced by glyph data in the received character data. In some aspects, character data for additional characters may be requested by and sent to the client device as necessary. As previously discussed, by sending the supported character list and modified font first, and subsequently sending character data for a set of characters to further populate the data in the modified font (e.g., the character map data or the glyph data), the client device is able to render a webpage once the character data for the necessary characters have been provided and without the entire font needing to be downloaded. The remainder of the glyph table may be populated by additional character data for the other characters sent to the client device at a later time. By utilizing such a process, the latency associated with rendering a web page with web fonts may be reduced, thereby improving the user experience.

Figure 6:
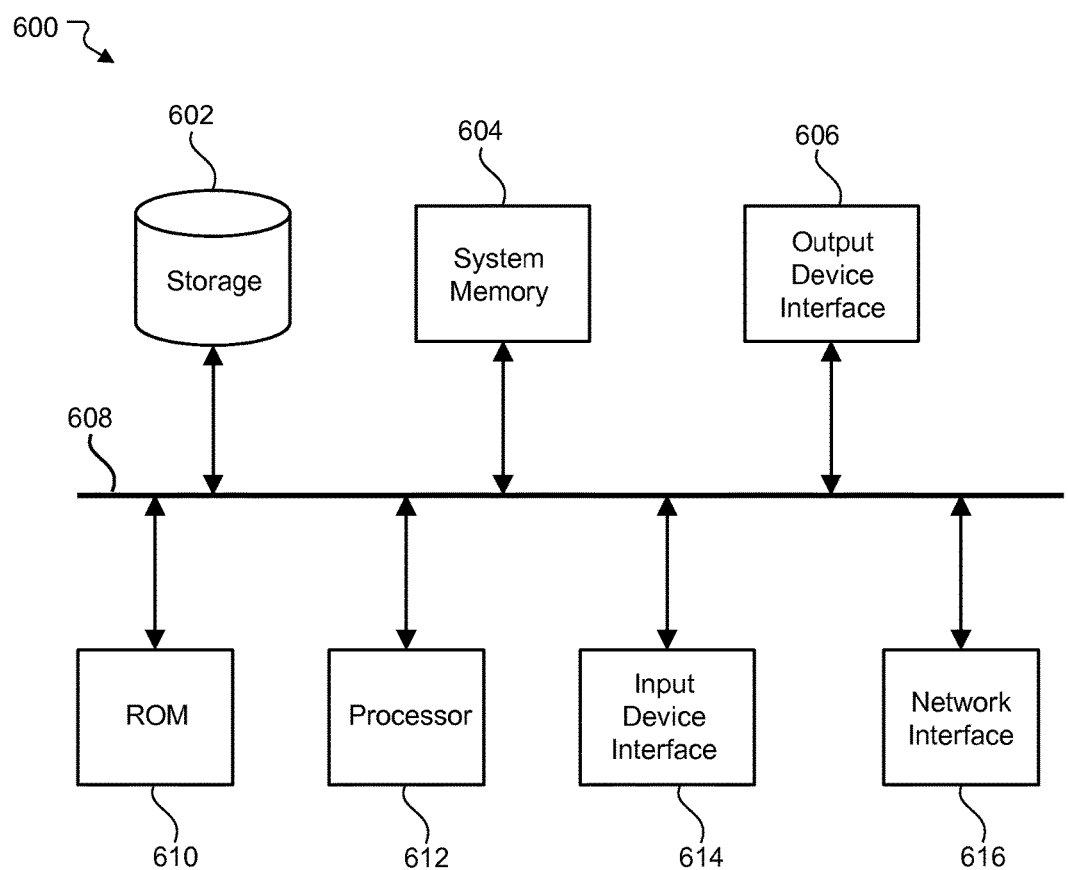
FIG. 6 conceptually illustrates an example electronic system with which some implementations of the subject technology are implemented.

FIG. 6 conceptually illustrates an example electronic system 600 with which some implementations of the subject technology are implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for incremental web font loading, in accordance with some implementations. From these various memory units, processing unit(s) 612 retrieves instructions and data in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interface 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers, such as a local area network, a wide area network, or an Intranet, or a network of networks, such as the Internet. Any or all components of electronic system 600 can be used in conjunction with the subject disclosure.

Many of the above-described features and applications are implemented as software processes that are specified as a set of instructions recorded on a computer readable storage medium (also referred to as a computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to an application on a user's client device in response to requests received from the application.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method for providing a font, the method comprising:
    receiving a request from a client device to download a font;
    accessing the requested font, wherein the accessed font comprises a requested character map and a requested glyph table;
    creating a supported character list and a modified font based on the requested character map, wherein the modified font comprises a modified character map and a modified glyph table, and wherein the modified character map comprises placeholder data for at least one character of the accessed font;
    compressing the modified font;
    sending the supported character list and the compressed modified font to the client device;
    sending, to the client device after sending the supported character list and the compressed modified font to the client device, character data comprising character map data for the at least one character in the modified font, and glyph data for the at least one character in the modified font, and location data for the character map data and the glyph data;
    wherein the character map data is for filling in the placeholder data for the at least one character in the modified character map in the modified font based on the location data; and
    wherein the glyph data is for merging the at least one character into the modified glyph table based on the location data.

2. The computer-implemented method of claim 1, wherein creating the modified font comprises replacing data from the requested glyph table with replacement data.

3. The computer-implemented method of claim 1, further comprising receiving, after sending the supported character list and the compressed modified font to the client device, a request for character data associated with the requested font, wherein the request for character data is based on the supported character list, wherein the request for character data is based on characters having placeholder data in the modified character map, and wherein sending the character data to the client device is in response to the received request for the character data.

4. The computer-implemented method of claim 3, wherein the character data sent to the client device includes the requested character data and character data related to the requested character data.

5. The computer-implemented method of claim 1, wherein the character data sent to the client device represents data for a subset of all characters of the requested font.

6. The computer-implemented method of claim 1, further comprising:
    receiving, after sending the character data to the client device, one or more additional requests for additional character data for one or more additional sets of characters associated with the font to be downloaded; and
    sending the requested additional character data to the client device based on the one or more additional requests.

7. The computer-implemented method of claim 6, wherein each of the requested additional character data is for characters in the font that have not been previously requested.

8. The computer-implemented method of claim 1, wherein the glyph data for merging into the modified glyph table based on the location data is merged based on positional offset data provided by the location data.

9. The computer-implemented method of claim 1, wherein merging all of the glyph data into the modified font based on the supported character list creates a font functionally identical to the accessed font.

10. The computer-implemented method of claim 1, wherein the supported character list, the modified font, and the character data are provided for storage on persistent memory at the client device for future use.

11. A non-transitory machine-readable medium comprising instructions stored therein, which when executed by a system, cause the system to perform operations comprising:
    receiving a request from a client device to download a font;
    accessing the requested font, wherein the accessed font comprises a corresponding character map and a corresponding glyph table;
    creating a supported character list and a modified font based on the corresponding character map, wherein the modified font comprises a modified character map and a modified glyph table, and wherein the modified character map comprises placeholder data for at least one character of the accessed font;
    compressing the modified font;
    sending the supported character list and the compressed modified font to the client device;
    sending, to the client device after sending the supported character list and the compressed modified font to the client device, character data comprising character map data for the at least one character, glyph data for the at least one character, and location data for the character map data and glyph data, wherein the character map data is for merging the at least one character into the modified font based on the location data to replace the placeholder data for the at least one character in the modified font.

12. The non-transitory machine-readable medium of claim 11, wherein the creating of the modified font comprises:
unfolding the character map of the requested font such that character data may be added to the modified font without regard to any other character data received; and
replacing data from the corresponding glyph table with replacement data.

13. The non-transitory machine-readable medium of claim 11, wherein the operations further comprise:
compressing the modified font, wherein the modified font downloaded to the client device is a compressed modified font.

14. The non-transitory machine-readable medium of claim 11, wherein the character data sent to the client device represents a subset of all character data of the requested font, and wherein the operations further comprise:
receiving, after sending the character data to the client device, one or more additional requests for additional character data of the requested font; and
sending the additional character data to the client device based on the received one or more additional requests.

15. The non-transitory machine-readable medium of claim 14, wherein the requested additional character data represents character data in the requested font that has not been previously requested.

16. The non-transitory machine-readable medium of claim 11, wherein the character data for merging into the modified font based on the supported character list is merged based on positional offset data provided by a server, and wherein merging the characters into the modified font creates a font functionally identical to the accessed font for the characters which have been received by the client device.

17. A system for providing a font, the system comprising:
one or more processors; and
a machine-readable medium comprising instructions stored therein, which when executed by the processors, cause the processors to perform operations comprising:
receiving a request from a client device to download a font;
accessing the requested font, wherein the accessed font comprises a corresponding character map and a corresponding glyph table;
creating a supported character list and a modified font based on the corresponding character map, wherein the modified font comprises placeholder data for at least one character of the accessed font;
compressing the modified font;
sending the supported character list and the compressed modified font to the client device;
sending, after sending the supported character list and the compressed modified font to the client device, first character data for characters in the modified font to the client device, wherein the first character data is for merging into the modified font by replacing corresponding portions of the placeholder data; and
sending a second character data for characters in the modified font to the client device, wherein the second character data is for merging into the modified font by replacing corresponding portions of the placeholder data, and wherein each character in the second character data is different from characters in the first character data.

18. The system of claim 17, wherein the second character data is sent to the client device after the first character data has been sent to the client device.

19. The system of claim 17, wherein the operations further comprise:
receiving a first request for the first character data associated with the requested font, wherein sending the first character data to the client device is based on the received first request; and
receiving a second request for the second character data associated with the requested font, wherein sending the second character data to the client device is based on the received second request.

20. The system of claim 17, wherein each of the first character data and the second character data sent to the client device represents a subset of all character data of the requested font.

* * * * *